United States Patent [19]

Moore et al.

[11] Patent Number: 4,913,974

[45] Date of Patent: Apr. 3, 1990

[54] UV-STABILIZED MELAMINE-POLYOL COATED THERMOPLASTIC SUBSTRATE

[75] Inventors: James E. Moore, Mt. Vernon, Ind.; Arnold Factor; Peter M. Miranda, both of Scotia, N.Y.

[73] Assignee: General Electric Company, Pittsfield, Mass.

[21] Appl. No.: 140,109

[22] Filed: Dec. 31, 1987

[51] Int. Cl.$^4$ .................. B32B 27/36; C08G 12/32
[52] U.S. Cl. ............................... 428/480; 428/483; 428/412; 428/524; 528/127; 528/128; 528/229
[58] Field of Search ............... 428/442, 524, 480, 483

[56] References Cited

U.S. PATENT DOCUMENTS

| | | | |
|---|---|---|---|
| 4,197,392 | 3/1980 | Moore | 528/127 |
| 4,714,657 | 12/1987 | Quinn et al. | 428/412 |

FOREIGN PATENT DOCUMENTS 1197246  1/1982  Canada ................... 249/20

Primary Examiner—P. C. Ives
Attorney, Agent, or Firm—Spencer D. Conard

[57] ABSTRACT

Coated article has a thermoplastic substrate and a surface coating of a transparent ultraviolet light-resistant polymer which is the reaction product of a melamine compound, a polyol, and a multimeric benzotriazole compound. The coating of the coated article retains its UV absorbance during curing and exposure to elevated temperatures.

8 Claims, No Drawings

UV-STABILIZED MELAMINE-POLYOL COATED THERMOPLASTIC SUBSTRATE

BACKGROUND OF THE INVENTION

This invention relates to novel coatings for thermoplastic articles. More particularly, the invention relates to novel ultraviolet light-absorbing melamine-polyol coatings.

Melamine-polyol coatings are used to provide abrasion and solvent resistance to thermoplastic substrates. These coatings sometimes include UV absorbers to protect the substrates from UV degradation which can cause yellowing, embrittlement, and coating adhesion failure. A problem which has been encountered with respect to these coatings is that conventional UV-absorbing compounds are sometimes too volatile or unstable to be retained in the coatings at elevated temperatures over prolonged times. U.S. Pat. No. 4,197,392 describes a coating formed from a melamine nucleus compound, a polyol and a benzophenone derivative as a UV absorber. In this coating, the UV absorber reacts with the melamine nucleus to form a non-volatile absorber.

A need continues to exist for melamine-polyol coatings which have high UV absorptivities and which maintain such absorptivities at elevated temperatures.

SUMMARY OF THE INVENTION

In accordance with the present invention, novel ultraviolet radiation resistant surface coatings containing (A) a melamine nucleus compound of the formula

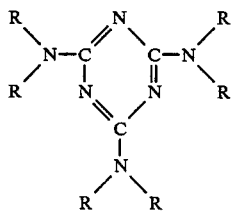

wherein the R groups independently are selected from H, $-CH_2OH$, and $-CH_2O(CH_2)_xH$, wherein x is an integer from 1 to 4; (B) a UV-absorbing amount of a multimeric benzotriazole of the formula

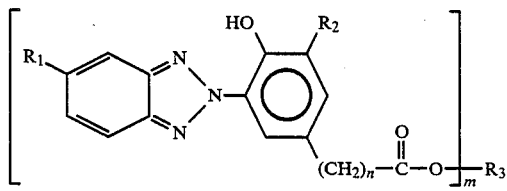

wherein $R_1$ is hydrogen, a halogen, a lower alkyl of from 1 to about 6 carbon atoms or a lower alkoxy of from to about 6 carbon atoms. $R_2$ is hydrogen, halogen, lower alkyl of from 1 to about 6 carbon atoms, or an arylsulfonyl, wherein the aryl group contains from 6 to about 10 carbon atoms; n is an integer from 1 to about 4, m is 2 or 3 and $R_3$ is a divalent or trivalent hydrocarbon radical or lower alkyl ether radical of from 2 to about 22 carbon atoms. In preferred compounds $R_2$ is hydrogen or a lower branched alkyl group of from 3 to about 6 carbon atoms; and (C) a polyfunctional compound containing at least two hydroxyl groups. The coatings are particularly well suited for protecting polycarbonate resins and other UV light degradable materials.

DETAILED DESCRIPTION OF THE INVENTION

Melamine nucleus compounds which can be employed in the invention are those of the above formula wherein the R groups can be hydroxymethyl, methoxymethyl, ethoxymethyl, propoxymethyl, butoxymethyl or hydrogen. Preferably the R groups are all the same and are alkoxymethyl.

The polyfunctional compound containing at least two hydroxyl groups can be aromatic or aliphatic. Representative aromatic compounds are phenols which include resorcinol, 2,2'-methylenediphenol, 2,4'-methylenediphenol, 4,4'-isopropylidenediphenol, 4,4'-(cyclohexylidene)diphenol, 4,4'-dihydroxydiphenol, and 4,4'-dihydroxydiphenylsulfone. Representative aliphatic compounds are polyhydric alcohols, which include ethylene glycol, diethylene glycol, triethylene glycol, tetra- ethylene glycol, propylene glycol, 1,3-propanetriol, pentaertythritol and sorbitol. In addition, the polyfunctional hydroxyl compound can be an alkyd resin, such as a hydroxyl containing epoxy resin, a soluble cellulose derivative, a vinyl polymer having free hydroxyl groups, such as poly (vinyl alcohol) or partially saponified poly (vinyl acetate). Preferred polyfunctional hydroxyl compounds are acrylics polyols and polyester polyols. Such acrylic polyols include copolymers of about 0.2 to about 10% by wt. hydroxy-containing vinyl monomers such as hydroxylalkyl acrylate and methacrylate having 2 to 6 carbon atoms in the alkyl group and 90 to 99.8% by wt. of other ethylenically unsaturated copolymerizable materials such as alkyl acrylates and methacrylates; the percentages by weight being based on the total weight of the monomeric charge.

Suitable polyester polyols are hydroxy-terminated reaction products of lower $C_1-C_{10}$ aliphatic and cycloalphatic diols and lower $C_1-C_{10}$ aliphatic or $C_6-C_{10}$ aromatic dicarboxylic acids. Examples of suitable polyester polyols are poly(hexanediol adipate), poly(butanediol fumarate), poly(hexanediol adipatephthalate), and the like.

Examples of suitable hydroxyalkyl acrylates and methacrylates are acrylic acid and methacrylic acid esters of ethylene glycol and propylene glycol.

Examples of suitable alkyl acrylates and methacrylates are lauryl methacrylate, 2-ethylhexyl methacrylate and n-butyl acrylate. The polyfunctional hydroxyl compound (e.g. polyol) can also contain carboxyl and amine groups.

The UV-absorbing compound of formula II preferably is a dimeric benzotriazole, where $R_2$ is tert-butyl and $R_3$ $-CH_2-CH_2(OCH_2CH_2)_y-$ or $-(CH_2)_6-$, wherein y is an integer from about 2 to about 4. The UV-absorbing compound may be a mixture of compounds of formula II.

The amount of the multimeric benzotrizole UV-absorbing compound employed in the coating can vary, depending upon the degree of UV absorbance desired and the intended thickness of the coating. In general, the UV-absorbing compound is used in an amount sufficient to provide a UV absorbance (wavelength?) of the coating layer greater than about 2.0, preferably greater than about 2.5, at the wavelength of maximum UV absorbance ($\lambda_{max}$).

Generally, the melamine nucleus compound will constitute from about 20 to about 80 percent of the mixture and the polyol the remainder, exclusive of the UV-absorbing compound.

To form the UV light-resistant coating composition and apply it to a suitable substrate, the reactants can be dissolved or suspended in a solvent such as n-butanol, ethanol and the like, preferably with a suitable acid catalyst which is activated at elevated temperature such as benzene sulfonic acid and sulfamic acid and preferably with a surface active agent to aid in forming a film of the composition. A variety of catalysts and surface active agents can be employed and are commercially available.

The coating composition can be applied to the thermoplastic substrate by conventional means, such as spraying, dipping and the like. The thickness of the coating may vary, and generally ranges between about 0.05 mil and about 0.5 mil for a substrate of between about 1 mil and about 0.5 inches. After application, the coating composition is cured by heating from about 100° to about 150° C. for a period of about 15 minutes to about four hours. The resulting coating is fully polymerized and strongly adhered to the substrate. The coated article is resistant to UV degradation, and the multimeric benzotriazole remains in the coating during curing and subsequent uses of the article which may involve elevated temperatures.

Among the materials which can be protected by the compositions of the invention are those which are readily degraded by UV light such as, for example, polycarbonates, polyestercarbonates, polycarbonate-polysiloxane copolymers, acrylics, polystyrene, polybutylphthalate, polyvinyl chloride, poly (2,6-dimethylphenylene oxide) alone or copolymerized with height impact polystyrene.

The following examples will serve to illustrate the invention, but are not meant to be limiting. All parts and percentages in said examples and elsewhere in the specification and claims are by weight unless otherwise indicated.

EXAMPLE I

A coating blend of 90 parts of hexamethoxymethylmelamine (Cymel 301, commercially available form American Cyanamid Co.) and 180 parts of an acrylic polyol having a hydroxyl value of 73 and a dyn. viscosity of about 6000 mPas at 20° C. (commercially available from Degussa Corp. as grade LS73) and catalyzed with 3.75 parts 40% p-toluene sulfonic acid dissolved in isopropanol premixed with 0.88 parts triethylamine (to stabilize the p-toluene sulfonic acid). The reaction mixture was then diluted with 330 parts of a 4:1 mixture of 2-butyoxyethanol and the methyl ether of propyleneglycol.

Ten parts of a UV absorber solution were added to this mixture. The UV absorber solution was a 90% solution of triethyleneglycoldiester of 3[3-tert-butyl 4-hydroxy-5-(benzotriazole-2-yl] propionic acid dissolved in toluene. Lexan ® polycarbonate panel and Lexan ® polycarbonate films were dipped into this coating composition and air dried for one hour and then cured for two hours at 125° C. UV absorbance measurements were made on the coated films before and after the two hour bake to determine UV absorbance losses during curing. The coated film maintained 97% of its UV absorbance during cure. With an additional 48 hours of baking at 125° C., the film retained 95.9% of its UV absorbance at $\lambda_{max}$.

The coated panel was then subjected to abrasion, scribed adhesion and water soak testing. The abrasion test was one wherein test panels having a ¼ inch diameter hole cut in their centers were subjected to a Taber Abraser. The Taber Abraser was equipped with CS-10F wheels which are resurfaced every 100 cycles by abrading for 25 cycles on a S-111 refacing disc. Five hundred gram weights were used in combination with CS-10F wheels. Initial measurements of % Haze were made at four places around the wear track of the sample using a Gardner Hazemeter. The sample was abraded for 100 cycles, cleaned with isopropanol, and the % Haze was remeasured at the same four places. The four differences in % Haze were calculated and averaged to give the Δ% Haze. The Δ% Haze of the uncoated panel was 34. The results of the Taber Abrasion test with the coated panel are shown in Table I below.

The Scribed Adhesion Test consisted of cutting parallel grooves through the coating into the substrate with a multi-bladed tool. The sample was then rotated 903 and the cutting repeated. This procedure was left a grid pattern of 1 mm squares cut into the coating. An adhesive tape (Scotch brand 801 Magic Transparent tape) was applied over the crosshatched area and quickly pulled off. A sample fails the adhesion test if any of the squares are pulled off. The results of this test are shown in Table I below.

In the water soak test, the sample was tested in accordance with the above-described adhesion test and immersed in a 65° C. water bath. The reported figure is the number of days which the sample is soaked before any flaking or detachment of the squares in the lattice is observed in subsequent adhesion tests. The results are shown in Table I below.

EXAMPLE 2

(Comparative)

The procedure of Example 1 was repeated in all essential details, except that 9 parts of a conventional monomeric benzotriazole UV absorber (no solvent) were substituted for the dimeric benzotriazole UV absorber. The monomeric benzotriazole absorber was 2(2'-hydroxy-5'-methylphenyl)benzotriazole (obtained from Ciba-Geigy Corp. under the trademark Tinuvin ® P).

The resulting coated panel retained only 24% of its UV absorbance during the curing step, and retained only 11.1% of its UV absorbance during the additional baking step. The results of the abrasion, scribed adhesion and the water soak tests are shown in Table I below.

These examples demonstrate that the dimeric benzotrizole UV absorber is much more stable in the melamine-polyol coatings than is the monomeric benzotriazole. The results shown in Table I demonstrate that the physical properties of the coatings of this invention are substantially equivalent to those of similar coatings which contain conventional UV absorbance.

TABLE I

| Example | Taber % H | Adhesion | (Days to Failure) 653 H$_2$O Bath Adhesion |
|---|---|---|---|
| 1 | 9.8 | Pass | 2 days |
| 2 | 9.2 | Pass | 2 days |

We claim:

1. A coated article comprising a thermoplastic substrate and a surface coating of a transparent ultraviolet light-resistant polymer comprising the reaction product of a mixture of a melamine compound, a polyol and a UV absorber, (A) said melamine compound being present at a level of from about 20% to 80% by weight based on the total weight of the mixture exclusive of the UV absorber, said melamine compound having the formula,

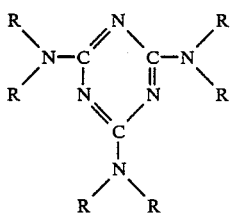

wherein the R groups are independently selected from H, —$CH_2OH$, —$CH_2O(CH_2)_xH$, wherein x is an integer from 1 to 4;

(B) said polyol being present at a level of from 80% to 20% by weight based on the total weight of the mixture exclusive of the UV absorber, and (C) said UV absorber being present in a stabilizing amount, said UV absorber having the formula

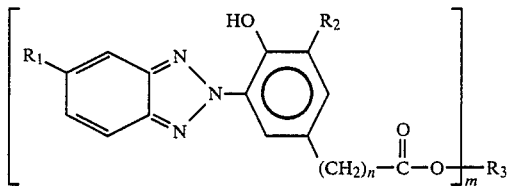

wherein $R_1$ is hydrogen, a halogen, a lower alkyl of from 1 to about 6 carbon atoms or a lower alkoxy of from 1 to about 6 carbon atoms; $R_2$ is hydrogen, halogen, lower alkyl of from 1 to about 6 carbon atoms, or an arylsulfonyl, wherein the aryl group contains from 6 to about 10 carbon atoms; n is an integer from 1 to about 4, m is 3 and $R_3$ is a trivalent hydrocarbon radical or lower alkyl ether radical of from 2 to about 22 carbon atoms.

2. The coated article of claim 1 wherein the polyol is an aliphatic straight chain polyol.

3. The coated article of claim 2 wherein the polyol is an olefinic polyol.

4. The coated article of claim 2, wherein the polyol is an acrylic polyol.

5. The coated article of claim 2, wherein the polyol is a polyester polyol.

6. The coated article of claim 2, 3, 4 or 5, wherein the melamine nucleus compound is hexa(methoxyl)melamine.

7. The coated article of claim 2, 3, 4, or 5, wherein the melamine nucleus compound is hexa(methylol)melamine.

8. The coated article of claim 1 wherein $R_2$ is tert-butyl.

* * * * *